United States Patent
Geddes et al.

(10) Patent No.: US 9,146,776 B1
(45) Date of Patent: Sep. 29, 2015

(54) SYSTEMS AND METHODS FOR CONTROLLING FLOW OF MESSAGE SIGNALED INTERRUPTS

(75) Inventors: David Geddes, Fremont, CA (US); Hung W. Goh, San Jose, CA (US)

(73) Assignee: Marvell International LTD., Hamilton (BM)

( * ) Notice: Subject to any disclaimer, the term of this patent is extended or adjusted under 35 U.S.C. 154(b) by 343 days.

(21) Appl. No.: 13/585,456

(22) Filed: Aug. 14, 2012

Related U.S. Application Data (60) Provisional application No. 61/524,261, filed on Aug. 16, 2011.

(51) Int. Cl.
  *G06F 13/24* (2006.01)
  *G06F 9/48* (2006.01)

(52) U.S. Cl.
  CPC .................................... *G06F 9/4812* (2013.01)

(58) Field of Classification Search
  CPC ...................................................... G06F 9/4812
  USPC .................................................. 710/260–269
  See application file for complete search history.

(56) References Cited

U.S. PATENT DOCUMENTS

| | | | |
|---|---|---|---|
| 3,508,206 A * | 4/1970 | Norberg ........................ | 710/269 |
| 5,103,446 A | 4/1992 | Fischer | |
| 5,185,864 A * | 2/1993 | Bonevento et al. ............. | 710/48 |
| 5,319,752 A | 6/1994 | Petersen et al. | |
| 5,355,503 A * | 10/1994 | Soffel et al. .................... | 713/322 |
| 5,367,689 A * | 11/1994 | Mayer et al. ................... | 710/260 |
| 5,560,019 A * | 9/1996 | Narad ............................ | 710/260 |
| 5,619,705 A | 4/1997 | Karnik et al. | |
| 5,708,814 A * | 1/1998 | Short et al. .................... | 710/260 |
| 5,771,387 A | 6/1998 | Young et al. | |
| 5,784,649 A | 7/1998 | Begur et al. | |
| 5,790,530 A | 8/1998 | Moh et al. | |
| 5,822,568 A | 10/1998 | Swanstrom | |
| 6,125,399 A | 9/2000 | Hamilton | |
| 6,170,025 B1 | 1/2001 | Drottar et al. | |
| 6,253,275 B1 | 6/2001 | Waldron et al. | |
| 6,308,228 B1 | 10/2001 | Yocum et al. | |
| 6,330,630 B1 | 12/2001 | Bell | |
| 6,629,179 B1 * | 9/2003 | Bashford ....................... | 710/260 |
| 6,845,419 B1 * | 1/2005 | Moyer ........................... | 710/264 |
| 6,941,398 B2 | 9/2005 | Lai et al. | |
| 7,003,615 B2 | 2/2006 | Chui et al. | |
| 7,024,509 B2 * | 4/2006 | Duncan et al. ................. | 710/311 |
| 7,028,122 B2 * | 4/2006 | Williams ....................... | 710/260 |
| 7,162,559 B1 * | 1/2007 | Kallat et al. ................... | 710/262 |
| 7,325,084 B1 * | 1/2008 | Marmash et al. ............. | 710/269 |
| 7,334,086 B2 | 2/2008 | Hass et al. | |
| 7,363,412 B1 | 4/2008 | Patel | |
| 7,461,210 B1 | 12/2008 | Wentzlaff et al. | |

(Continued)

OTHER PUBLICATIONS

International Search Report and Written Opinion for PCT Application No. PCT/IB2012/002561 dated Jun. 12, 2013; 8 pages.

*Primary Examiner* — Paul R Myers (57) ABSTRACT

A system including an interrupt generation module and a processing detection module. The interrupt generation module is configured to generate an interrupt when a first indicator is set to a first state, where the first indicator transitions to a second state when the interrupt is generated. The processing detection module is configured to detect when the interrupt is sent, set a second indicator to a third state to indicate when the interrupt is sent, and set the second indicator to a fourth state when the interrupt is processed.

12 Claims, 5 Drawing Sheets

(56) References Cited

U.S. PATENT DOCUMENTS

| | | |
|---|---|---|
| 7,496,707 B2 | 2/2009 | Freking et al. |
| 7,526,592 B2 | 4/2009 | Tsuruta |
| 7,564,860 B2 | 7/2009 | Wybenga et al. |
| 7,805,556 B2 * | 9/2010 | Hagita .......................... 710/262 |
| 8,200,875 B2 | 6/2012 | Kanaya |
| 8,478,834 B2 | 7/2013 | Blocksome |
| 8,554,968 B1 | 10/2013 | Onufryk et al. |
| 8,566,492 B2 * | 10/2013 | Madukkarumukumana et al. ............................ 710/260 |
| 2005/0034039 A1 * | 2/2005 | Prasadh et al. ................ 714/727 |
| 2008/0082713 A1 * | 4/2008 | Tsuruta ......................... 710/268 |

* cited by examiner

| Entry | Addr | DWord 3 | DWord 2 | DWord 1 | DWord 0 |
|---|---|---|---|---|---|
| Entry 0 | Base | Vector Ctrl | Msg Data | Msg Upper Addr | Msg Addr |
| Entry 1 | Base + 10h | Vector Ctrl | Msg Data | Msg Upper Addr | Msg Addr |
| Entry 2 | Base + 20h | Vector Ctrl | Msg Data | Msg Upper Addr | Msg Addr |
| ... | ... | ... | ... | ... | ... |
| Entry 15 | Base + F0h | Vector Ctrl | Msg Data | Msg Upper Addr | Msg Addr |

FIG. 4A

| DWORD | Byte3 | Byte2 | Byte1 | Byte0 |
|---|---|---|---|---|
| DW0 | RSVD | RSVD | PBA[15:0] | |
| DW1 | RSVD | RSVD | RSVD | |
| DW2 | PSA[15:0] | | PBA[15:0] | |
| DW3 | RSVD | RSVD | RSVD | |

| Bits | Field Name | R/W | Default Value | Description |
|---|---|---|---|---|
| 31:2 | MSG_ADDR[31:2] | R/W | 00000000h | Message Address[31:2] |
| 1:0 | MSG_ADDR[1:0] | R/W | 0h | Message Address[1:0] |

FIG. 4C

| Bits | Field Name | R/W | Default Value | Description |
|---|---|---|---|---|
| 31:0 | MSG_ADDR[63:32] | R/W | 00000000h | Message Address[63:32] |

FIG. 4D

| Bits | Field Name | R/W | Default Value | Description |
|---|---|---|---|---|
| 31:0 | MSG_DATA | R/W | 00000000h | Message Data |

FIG. 4E

| Bits | Field Name | R/W | Default Value | Description |
|---|---|---|---|---|
| 31:1 | VCTR_CTL[31:1] | R/W | 00000000h | Vector Control[31:1] |
| 0 | MASK_BIT | R/W | 1h | Mask Bit |

SYSTEMS AND METHODS FOR CONTROLLING FLOW OF MESSAGE SIGNALED INTERRUPTS

CROSS-REFERENCE TO RELATED APPLICATIONS

This application claims the benefit of U.S. Provisional Application No. 61/524,261, filed on Aug. 16, 2011. The disclosure of the above application is incorporated herein by reference in its entirety.

FIELD

The present disclosure relates generally to interrupt control and more particularly to systems and methods for controlling flow of Message Signaled Interrupts (MSI's).

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In computer systems using a Peripheral Component Interconnect (PCI) bus, a plurality of device controllers may be installed in PCI bus slots to control devices such as disk drives, for example. Each controller may issue an interrupt to a host processor when the controller generates a service request. For example, a controller may issue an interrupt when the controller needs to perform an input/output (I/O) operation, where data needs to be transferred, for example, from a device such as a disk drive to system memory or vice versa.

Typically, the PCI bus uses four interrupts. While each controller can be set to issue a different interrupt, most controllers are typically set to issue the same interrupt. When a controller issues an interrupt, the controller typically pulls a signal on the bus to a predetermined state (e.g., low or high). On receiving the interrupt, a basic input output system (BIOS) of the computer system polls the controllers to determine which controller issued the interrupt. Polling increases overhead of the PCI bus.

PCI Express (PCIe) bus may use Message Signaled Interrupts (MSI's). A controller using MSI's issues an interrupt by writing a system-specified data value to a system-specified memory location in main memory of the computer system. During system initialization (i.e., startup or boot process), the host programs each controller with an address of a memory location in the main memory and the data value to write in the memory location when issuing an interrupt.

For example, the host may populate a data structure in the controller with the addresses of a memory location and a corresponding data value. The address and data value corresponds to an interrupt that can be generated by a portion of hardware in the controller. Additional MSI interrupts can be generated using the address populated in the data structure by incrementing by one the data value programmed in the data structure.

MSIs allow a controller to issue up to 32 interrupts, each interrupt corresponding to a unique value in the lower 5 bits of the data value programmed into the data structure. For example, one interrupt can be generated by a write portion of the controller for writing data to the main memory while another interrupt can be generated by a read portion of the controller for reading data from the main memory.

PCIe bus may also use MSI-X interrupts. A controller using MSI-X issues an interrupt by writing a system-specified data value to a system-specified memory location in main memory of the computer system. During system initialization (i.e., startup or boot process), the host programs each controller with an address of a memory location in the main memory and the data value to write to the memory location when issuing an interrupt.

For example, the host may populate a table in the controller with the addresses of a memory location and a corresponding data value. The address and data value corresponds to an interrupt that can be generated by a portion of hardware in the controller. The host may enable additional MSI-X interrupts by populating address and data values into other entries in the table in the controller.

Each interrupt is assigned a separate address and data value. When a controller issues an interrupt, the host determines which controller issued the interrupt based on the address of the memory location written to and the data value written to the memory location. Extended MSI's (MSI-X) allow a controller to issue a larger number of interrupts (up to 2048).

In controllers using MSI or MSI-X interrupts, after an interrupt for a service request has been sent to the host, another interrupt for the same service request may be sent to the host at any time. In a system that performs one million I/O Operations per Second (IOPs), this can result in an interrupt being sent once every microsecond on average. A controller typically includes a Pending Bit Array (PBA), where a bit is set when an interrupt is scheduled to be sent to an interrupt controller. The bit is reset when the interrupt is sent to the interrupt controller. Multiple bits may be set at the same time when there are multiple interrupts scheduled to be sent to the interrupt controller.

SUMMARY

A system comprises an interrupt generation module and a processing detection module. The interrupt generation module is configured to generate an interrupt when a first indicator is set to a first state, where the first indicator transitions to a second state when the interrupt is generated. The processing detection module is configured to detect when the interrupt is sent, set a second indicator to a third state to indicate when the interrupt is sent, and set the second indicator to a fourth state when the interrupt is processed.

In other features, the system further comprises an interrupt control module configured to prevent the first indicator from being set to the first state when the second indicator is in the third state, and to allow the first indicator to be set to the first state when the second indicator is in the fourth state.

In other features, the system further comprises an interrupt detection module configured to detect when the interrupt is scheduled to be generated, set the first indicator to the first state to indicate when the interrupt is scheduled to be generated, and set the first indicator to the second state when the interrupt is generated.

In other features, the system further comprises a device control module configured to control a device and to output a first data from the device to a bus. The first data is to be written to memory associated with a processor. The interrupt detection module is configured to set the first indicator to the first state when the first data is output to the bus.

In other features, the interrupt generation module is configured to generate the interrupt by outputting second data to the bus in response to the first indicator being set to the first state. The interrupt detection module is configured to set the first indicator to the second state when the second data is output to the bus. The processing detection module is configured to set the second indicator to the third state when the second data is output to the bus.

In other features, the system further comprises an interrupt processing module configured to process the interrupt. The interrupt processing module is configured to receive the first data before receiving the second data, and notify the processing detection module when the first data has been processed. The processing detection module is configured to set the second indicator to the fourth state when the interrupt processing module has processed the first data.

In other features, the system further comprises a first-in first-out module configured to receive the first data followed by the second data from the bus, and output the first data followed by outputting the second data to the processor.

In still other features, a system comprises a device control module, an interrupt generation module, and an interrupt detection module. The device control module is configured to control a device and to output first data from the device to a bus, where the first data is to be written to memory. The interrupt generation module is configured to generate the interrupt by outputting second data to the bus in response to the first data being output to the bus by the device control module. The interrupt detection module is configured to detect when the first data is output to the bus, and in response to detecting that the first data is output to the bus, set a first indicator to a first state to allow the interrupt to be generated.

The interrupt generation module is configured to generate the interrupt in response to the first indicator being set to the first state. The interrupt detection module is configured to detect when the interrupt is generated, and in response to detecting that the interrupt is generated, set the first indicator to a second state.

In other features, the system further comprises an interrupt processing module configured to process the interrupt and a processing detection module configured to detect when the second data is output to the bus, and in response to detecting that the second data is output to the bus, set a second indicator to a third state. The processing detection module is configured to detect when the interrupt processing module completes processing the first data, and in response to detecting that the interrupt processing module has completed processing the first data, set the second indicator to a fourth state. The interrupt generation module is configured to not generate an additional interrupt while the second indicator is in the third state and until the second indicator is set to the fourth state.

In still other features, a method comprises generating an interrupt when a first indicator is set to a first state, where the first indicator transitions to a second state when the interrupt is generated; detecting when the interrupt is sent; setting a second indicator to a third state to indicate when the interrupt is sent; and setting the second indicator to a fourth state when the interrupt is processed.

In other features, the method further comprises preventing the first indicator from being set to the first state when the second indicator is in the third state; and allowing the first indicator to be set to the first state when the second indicator is in the fourth state.

In other features, the method further comprises detecting when the interrupt is scheduled to be generated; setting the first indicator to the first state to indicate when the interrupt is scheduled to be generated; and setting the first indicator to the second state when the interrupt is generated.

In other features, the method further comprises outputting a first data from a device to a bus, where the first data is to be written to memory associated with a processor; and setting the first indicator to the first state when the first data is output to the bus.

In other features, the method further comprises generating the interrupt by outputting second data to the bus in response to the first indicator being set to the first state; setting the first indicator to the second state when the second data is output to the bus; and setting the second indicator to the third state when the second data is output to the bus.

In other features, the method further comprises receiving the first data before receiving the second data; and setting the second indicator to the fourth state when the first data has been processed.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

The PCI Local Bus Specification does not provide a mechanism to synchronize sending of interrupts to an Interrupt Service Routine (ISR) in the host that services the interrupts. Therefore, the number of interrupts that can be sent to the host may far exceed the number of times the corresponding ISR is evoked by an operating system. This can result in redundant, unnecessary traffic on the PCIe bus. Further, after interrupts are sent to the interrupt controller, there is no record of which interrupts have been sent to the interrupt controller but have not yet been serviced by the ISR.

Additionally, since there is no synchronization between the controller that sends MSI-X interrupts to the host and the ISR in the host that services the interrupts, an undefined (race) condition can exist when an MSI-X interrupt is sent to the host while a previous interrupt for the same service request is being processed by the ISR in the host. The PCIe Local Bus Specification does not define how to handle interrupts that are received while the associated ISR is already running on the host processor. For example, consider the following sequence of events: a) An ISR is servicing an interrupt, has cleared the cause of the interrupt in the controller, but has not yet exited.

b) The controller sends another interrupt to the host. c) The ISR exits. In this sequence of events, the PCIe Local Bus Specification does not address or define whether to call the ISR again.

Another shortcoming of the PCI Local Bus Specification is that there is no defined mechanism that the ISR can use to determine which MSI-X interrupts have been sent to the host and are waiting for service. Numerous independent MSI-X interrupts can be sent to the host by a single PCIe controller. In a system that supports multiple MSI-X interrupts for a single controller, there is no way for an ISR running on the host to determine which other MSI-X interrupts have been sent to the host and need to be serviced.

The present disclosure discloses systems and methods to overcome the shortcomings of MSI-X interrupts as defined by the PCI Local Bus 3.0 specification. In one implementation, a Pending Service Array (PSA) is provided, where the PSA includes bits corresponding to interrupts sent by a controller to the interrupt controller. When an interrupt is sent by the controller and a corresponding bit is reset in the PBA, a corresponding bit is set in the PSA. When the ISR in the host is called by the operating system to service an interrupt, the ISR resets the bit in the PSA corresponding to the interrupt being serviced. Reading the PSA can indicate which of the interrupts sent have been serviced. No subsequent interrupts corresponding to a bit that is set in the PSA are sent again until the bit in the PSA corresponding to the interrupt is reset. These and other additional features of the present disclosure are discussed below in detail.

Figure 1:
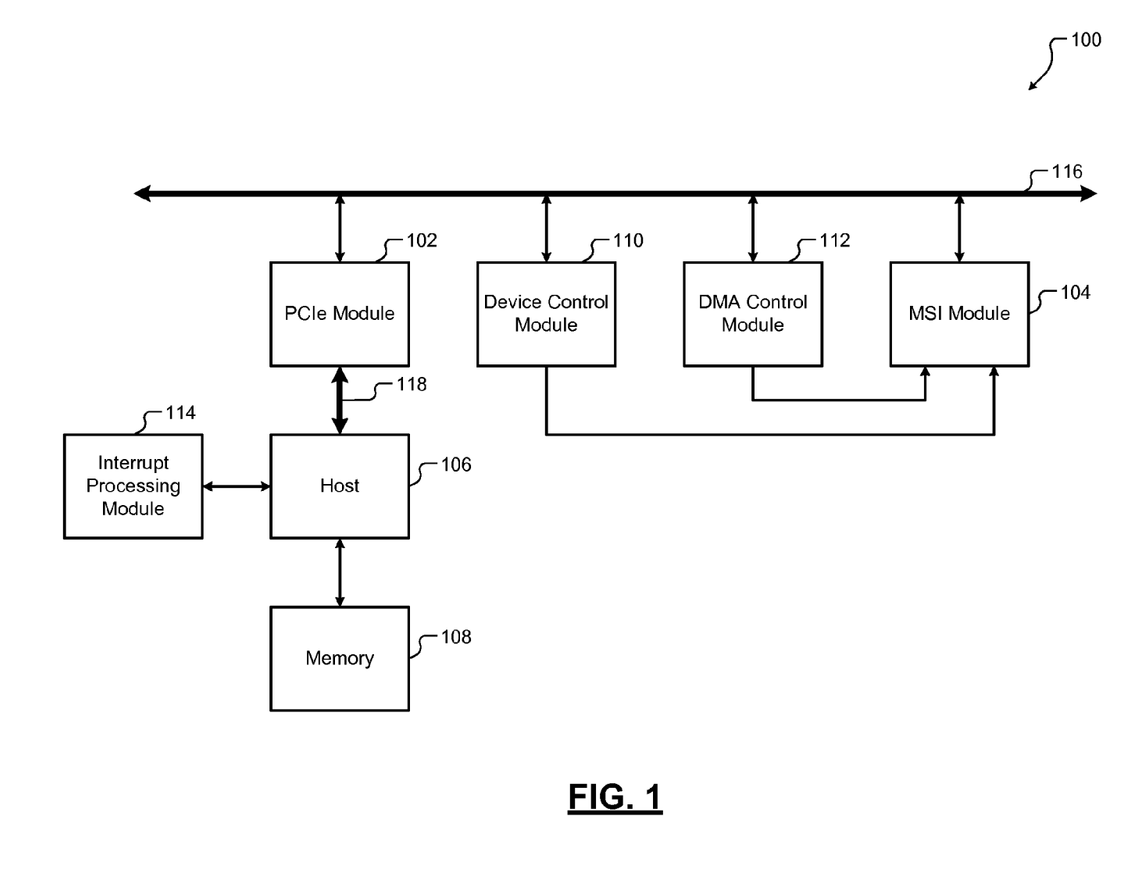
FIG. 1 is a functional block diagram of a system using Message Signaled Interrupts (MSI's)

Referring now to FIG. 1, a system 100 using PCIe bus according to the present disclosure is shown. The system 100 includes a PCIe module 102, a MSI module 104, a host 106, a main memory 108, a device control module 110, a direct memory access (DMA) module 112, and an interrupt processing module 11.4. The PCIe module 102, the MSI module 104, the device control module 110, and the DMA module 112 communicate via an Advanced Extensible Interface (AXI) bus 116. The MSI module 104, the device control module 110, and the DMA module 112 communicate with the host 106 via the PCIe module 102. The PCIe module 102 is connected to the host 106 via a PCIe bus 118. The interrupt processing module 114 is part of a host system comprising the host 106 and the main memory 108, and consists of a combination of host system resources and an ISR.

The device control module 110 may include a disk controller, for example, that controls a disk drive (not shown). The DMA module 112 controls DMA operations. The device control module 110 and the DMA module 112 transfer data to and from the main memory 108 by issuing memory read and write commands over the PCIe bus 118. The device control module 110 and the DMA module 112 also communicate directly with the MSI module 104. The MSI module 104 includes the PBA and PSA structures and handles interrupts associated with the read/write commands as described below in detail. The PCIe module 102 routes the read/write commands and the interrupts associated with the read/write commands to the host 106 as described below in detail.

Figure 2:
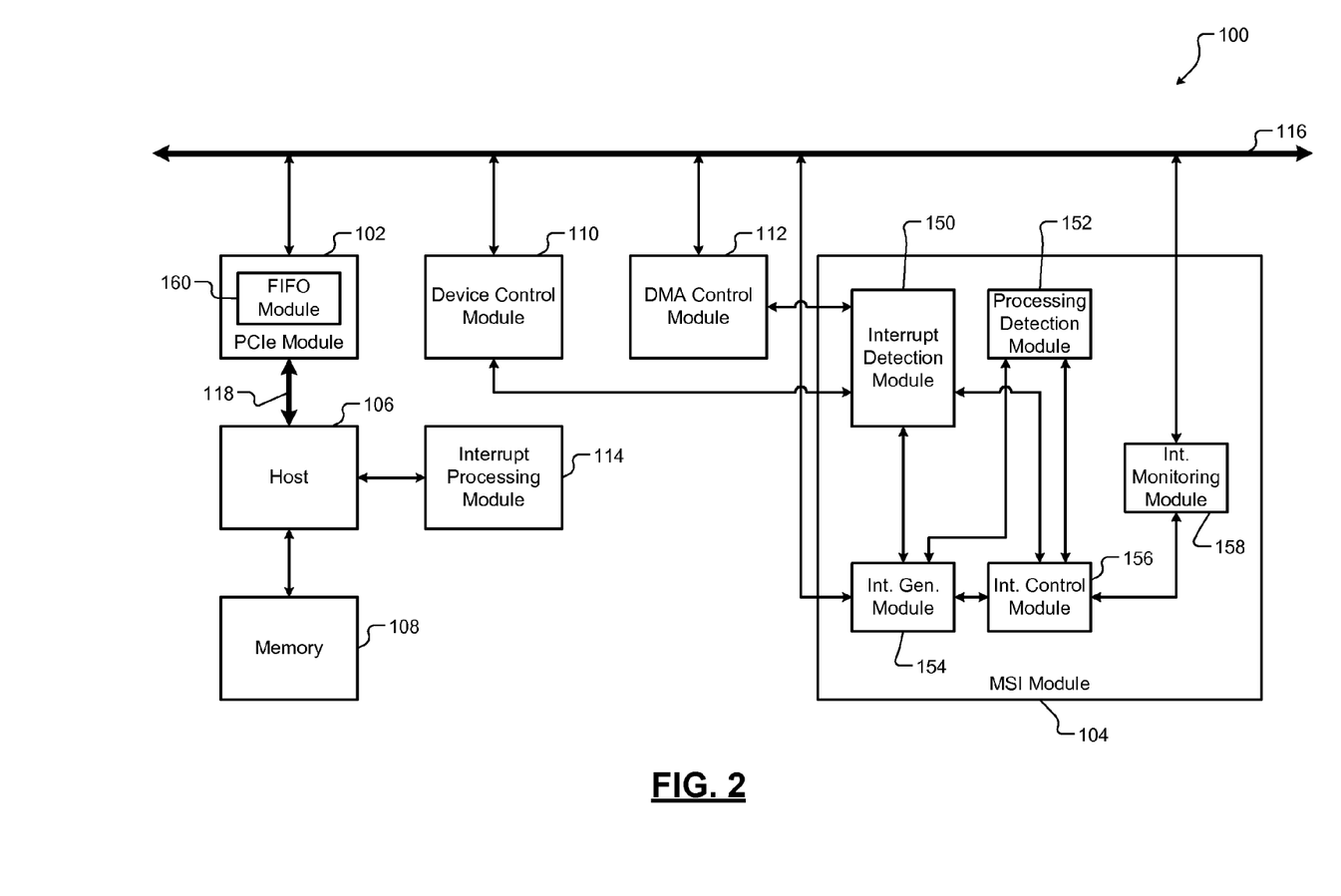
FIG. 2 is a functional block diagram of the system of FIG. 1 showing an MSI module in detail.

Referring now to FIG. 2, the system 100 is shown in detail. The MSI module 104 includes an interrupt detection module 150, a processing detection module 152, an interrupt generation module 154, an interrupt control module 156, and an interrupt monitoring module 158. The interrupt detection module 150 includes PBA structures for each interrupt for each controller (e.g., for the device control module 110 and the DMA module 112). The interrupt detection module 150 sets/resets bits in the PBA structures as described below. The processing detection module 152 includes PSA structures for each interrupt for each controller (e.g., for the device control module 110 and the DMA module 112). The processing detection module 152 sets/resets bits in the PSA structures as described below. The interrupt generation module 154 generates interrupts, and the interrupt control module 156 controls generation of interrupts as described below.

For example, suppose that the device control module 110 needs to write data (e.g., from the device such as a disk drive controlled by the device control module 110) to the main memory 108. The device control module 110 outputs a memory write command and associated data (i.e., data to be written to the main memory 108) to the AXI bus 116. The PCIe module 102 includes a first-in first-out (FIFO) module 160. The FIFO module 160 stores the memory write command and the associated data received from the device control module 110 via the AXI bus 116.

In addition, the device control module 110 communicates directly with the MSI module 104. In the MSI module 104, the interrupt detection module 150 includes PBA structures for interrupts corresponding to various I/O operations of the device control module 110, the DMA module 112, and so on. After the device control module 110 outputs the write command and associated data on the AXI bus 116, the device control module 110 provides an indication to the interrupt detection module 150 that an I/O operation (e.g., a write operation) is being performed by the device control module 110. The interrupt detection module 150 detects that the I/O operation is being performed by the device control module 110 based on the indication received from the device control module 110. The interrupt detection module 150 sets a bit in the PBA structure for an interrupt corresponding to the write operation initiated by the device control module 110. The bit, when set, enables the interrupt.

When the interrupt is enabled, the interrupt generation module 154 generates the interrupt by reading a memory address and a data value from an MSI-X table stored in the interrupt generation module 154 (the table is populated by the host 106 during power up as described below) and by outputting the memory address and the data value on the AXI bus 116. In other words, when the interrupt is enabled, the interrupt generation module 154 initiates a memory write operation to write the memory address and the data value to the main memory 108.

The FIFO module 160 in the PCIe module 102 receives the memory address and the data value from the interrupt generation module 154 following the write command and the associated data received from the device control module 110. The host 106 first receives the write command and the associated data from the FIFO module 160 and then receives the interrupt (i.e., the memory address and the data value generated by the interrupt generation module 154). In other words, the host 106 first receives the data to be processed and subsequently receives the interrupt to process the data.

The host 106 writes the data associated the write command to the main memory 108 at the address specified by the write command, and then writes the data value associated with the MSI-X interrupt at a memory location in the main memory 108 specified by the memory address from the MSI-X interrupt. When the data value from the MSI-X interrupt operation is written, the interrupt processing module 114 generates a call to an interrupt service routine (ISR) to service the interrupt (i.e., to process the write command and the associated data). The ISR processes the data associated with the write command to complete the data transfer initiated by the device control module 110.

The interrupt detection module 150 detects when the interrupt is sent (i.e., when the memory address and the data value are output to the AXI bus 116). The interrupt detection module 150 resets the PBA bit for the interrupt corresponding to the write operation initiated by the device control module 110 when the interrupt is sent. The processing detection module 152 includes PSA structures for the interrupts corresponding to various I/O operations of the device control module 110, the DMA module 112, and so on. The processing detection module 152 detects when the interrupt is sent and sets a bit in a PSA structure for the interrupt corresponding to the write operation initiated by the device control module 110 when the interrupt is sent. The host 106 notifies the processing detection module 152 when the ISR has serviced the interrupt (i.e., when the ISR has finished processing the write command and the associated data that was written in the main memory 108) by resetting a bit in a PSA structure for the interrupt corresponding to the write operation initiated by the device control module 110. The bit in the PSA structure is reset by writing a one to it.

The interrupt control module 156 prevents the interrupt generating module 154 from generating additional interrupts while the bit in the PSA is set and until the bit in the PSA is reset. The interrupt control module 156 prevents the interrupt detection module 150 from again setting the bit in the PBA and re-enabling the interrupt when the bit in the PSA is set. The interrupt control module 156 allows the interrupt detection module 150 to again set the bit in the PBA and re-enable the interrupt only after the bit in the PSA is reset.

During startup or boot process, the host 106 populates MSI-X tables (e.g., lookup tables) in the MSI module 104 with addresses of memory locations to write to in the main memory 108 and corresponding data values to be written into the memory locations when respective interrupts are generated. The PCIe module 102 performs address translation that allows the host 106 to write into the MSI-X tables and the PBA/PSA structures stored in the MSI module 104.

The MSI module 104 includes an interrupt monitoring module 158 that monitors interrupts of various controllers and that maintains two indexes for each controller: a producer index indicating the number of interrupt-generating events that have occurred in a controller and a consumer index indicating the number of interrupts of the controller that the ISR has finished servicing. The ISR updates the consumer index of a controller when an interrupt generated by the controller is serviced by the ISR. When a difference between the producer index and the consumer index is greater than or equal to a predetermined threshold, the controller may generate an interrupt.

The interrupt monitoring module 158 monitors the difference between the producer index and the consumer index for each controller, and generates an interrupt monitor signal that indicates to the interrupt control module 156 that interrupt-generating events have occurred in the controller. The interrupt control module 156 does not allow the PBA bit to be set (i.e., interrupts to be sent by the endpoint to the interrupt controller) until the PSA bit is set (i.e., until the ISR has serviced the interrupt). Once the PSA bit is cleared, the PSA bit is set and an interrupt is sent if the interrupt monitor signal indicates to the interrupt controller that interrupt-generating events have occurred.

Interrupts may be controlled in other ways. For example, in one implementation, in an MSI-X table stored in the MSI module 104, each entry corresponding to an interrupt includes an address and a data value for the interrupt, and a control field including a mask bit for the interrupt. The ISR controls the mask bit. An interrupt cannot be sent when the mask bit is set by the ISR. The ISR toggles the mask bit (i.e., resets the mask bit) when the ISR has serviced the interrupt. At the falling edge of the mask bit, if the interrupt monitor signal indicates that an interrupt-generating event has occurred, the bit corresponding to the interrupt is set in the PBA, and the interrupt is sent. The ISR requires only one write operation to reset the PSA bit but requires two write operations to set and reset the mask bit.

Alternatively, the ISR can instruct the hardware in a controller that causes an interrupt to not send another interrupt until the interrupt that is already sent by the hardware is serviced by the ISR. The ISR can accomplish this, for example, by initially disabling or masking an interrupt-sending capability of the hardware while the ISR services an interrupt and then enabling or unmasking the interrupt-sending capability of the hardware when the ISR has finished servicing the interrupt. Accordingly, the hardware that sent an interrupt is prevented from interrupting the ISR again until the ISR has finished servicing the interrupt.

Resetting the PSA bit, toggling the mask bit, or masking the interrupt sending capability of the hardware in a controller can also prevent a race condition that may exist when a new interrupt may be sent at a point when the ISR has finished servicing a prior interrupt but has not exited. The race condition is prevented by not allowing the hardware in the endpoint to send another interrupt immediately before the ISR exits.

Figure 3:
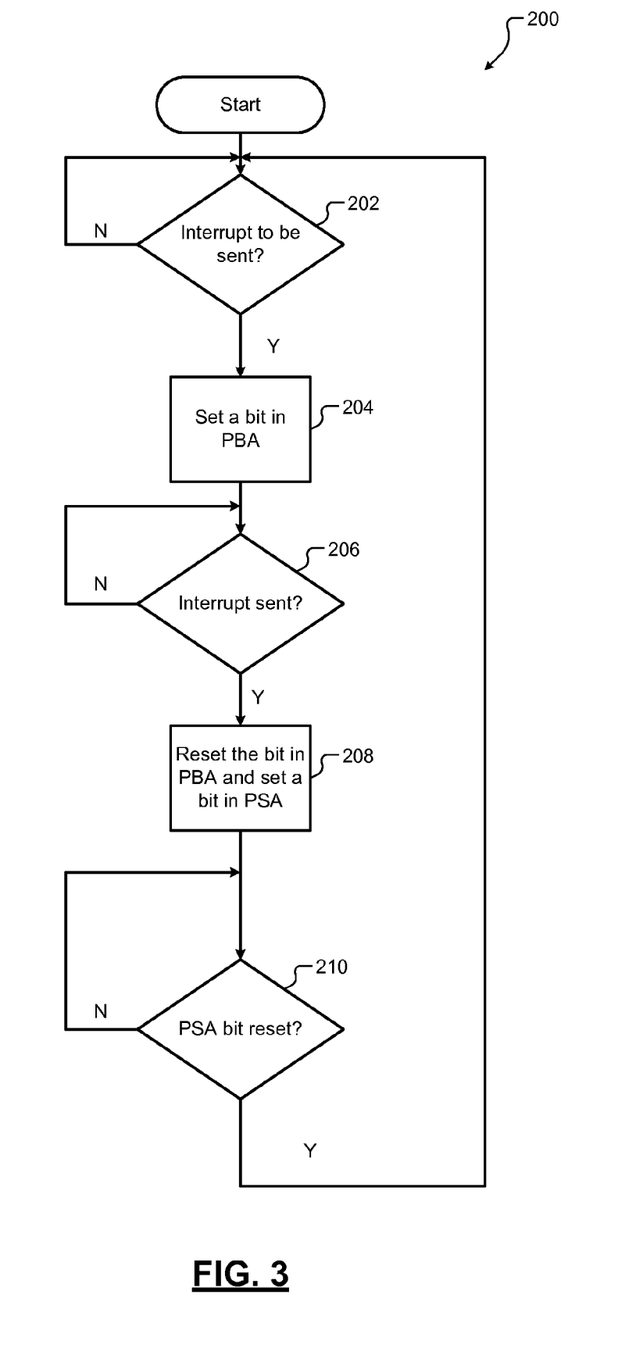
FIG. 3 is a flowchart of a method for controlling flow of MSI's.

Referring now to FIG. 3, a method 200 for controlling interrupts is shown. At 202, control determines if an interrupt needs to be sent. At 204, if an interrupt needs to be sent, control sets a bit in PBA and sends the interrupt. At 206, control determines if the interrupt is sent. At 208, if the interrupt is sent, control resets the bit in the PBA and sets a bit in PSA. At 210, control determines if the bit in the PSA is reset. Control waits until the bit in the PSA is reset before re-arming (i.e., re-enabling) the interrupt (e.g., control does not allow the bit in the PBA to be set until the bit in the PSA is reset).

Figure 4A:
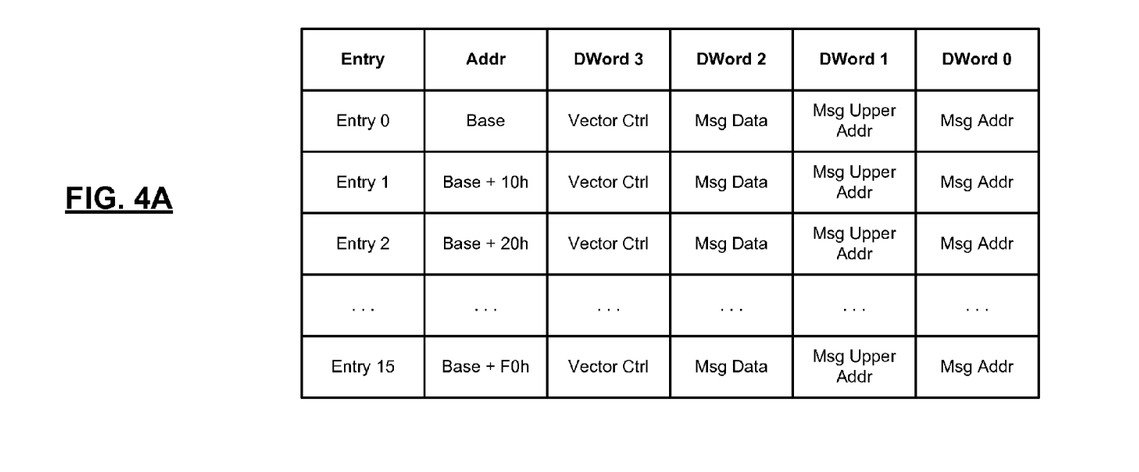
FIG. 4A depicts an example of a MSI-X table.

Referring now to FIGS. 4A-4F, examples of MSI-X table and PBA/PSA structures are shown. In FIG. 4A, an example of an MSI-X table is shown. Each entry in the table includes an address for a memory location in the main memory 108 where data or message relating to an interrupt is to be written when the interrupt is generated. Each MSI-X Table structure includes of 16 entries Each entry includes of 4 DWords (16 bytes). The total size of each MSI-X Table Structure is 256 bytes. An MSI-X Table may contain fewer or more than 16 entries, and its size will vary accordingly.

Figures 4B, 4C:
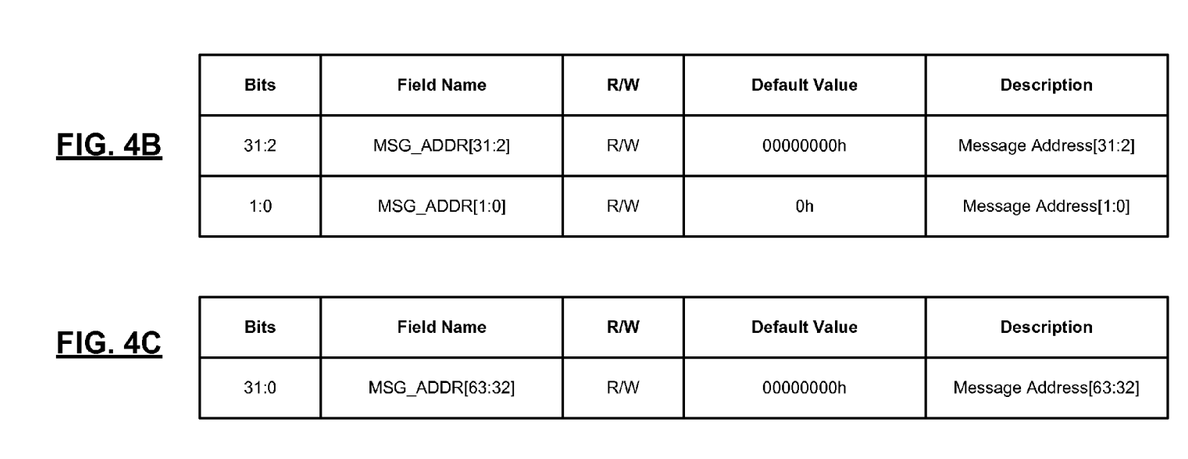
FIG. 4B depicts an example of a message address field in the MSI-X table.
FIG. 4C depicts an example of an upper message address field in the MSI-X table.
Figures 4D, 4E:
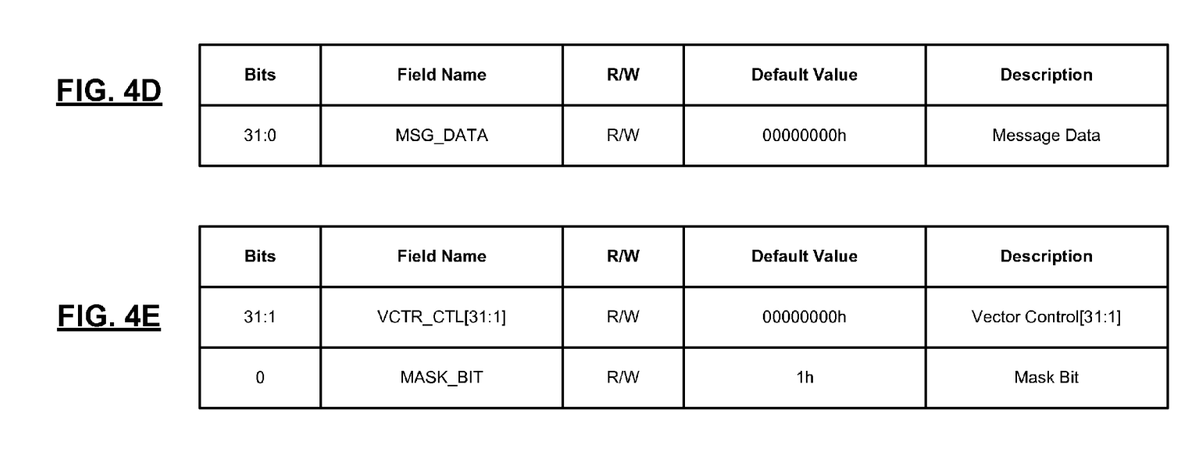
FIG. 4D depicts an example of a message data field in the MSI-X table.
FIG. 4E depicts an example of a vector control field in the MSI-X table.

In FIGS. 4B-4E, the fields in an entry are shown. FIG. 4B depicts an example of a message address field in the MSI-X table. FIG. 4C depicts an example of an upper message address field in the MSI-X table. FIG. 4D depicts an example of a message data field in the MSI-X table. FIG. 4B depicts an example of a vector control field in the MSI-X table. Each field is a 32-bit read/write field. The fields are written by the host 106 at power-up.

Figure 4F:
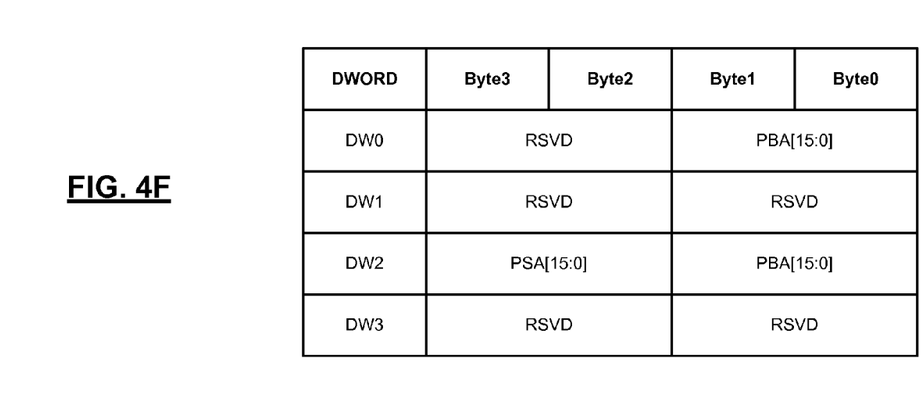
FIG. 4F depicts an example of Pending Bit Array (PBA)/Pending Service Array (PSA) structures.

In FIG. 4F. each PBA/PSA structure consists of two 64-bit QWords. A first Qword includes the PBA, and a second QWord includes both the PBA and the PSA. Inclusion of the PBA and PSA in the second QWord is optional. The PBA and PSA are bitmaps, each including 16 bits. Each bit corresponds to one entry in an associated MSI-X Table structure. Remaining bits of each QWord are reserved and return zeroes when read. The size of the PBA bitmap and the PBA bitmap correspond to the number of entries in the MSI-X Table. The PSA structure may be located in the PBA structure as shown in FIG. 4F, or may be located elsewhere in an endpoint device (e.g., the device control module 110 or the DMA module 112).

If a bit in PBA[15:0] is set, the bit indicates that an MSI-X Interrupt corresponding to that bit is scheduled to be generated. Bits in the PBA structure are automatically reset when a corresponding MSI-X Interrupt is generated. The PBA structures are Read-only, and writes to the PBA structures are ignored. Bits in the PBA structure are typically set by interrupt generation module 154 in the MSI module 104, which is located outside the MSI-X controllers. The bits in the PBA structure can also be set or reset by an internal CPU.

After an MSI or MSI-X interrupt message has been sent to the host, another interrupt message for that interrupt will not be sent until the interrupt is re-armed (i.e., re-enabled). The MSI module 104 supports two modes for re-arming interrupts: IRQ Toggle mode and PSA Required mode. Mode selection is controlled by an IRQ_TOGGLE_MODE bit located at Miscellaneous Control[8]. PSA Required mode is selected when this bit is reset.

When IRQ Toggle mode is selected, to re-arm an individual interrupt, the ISR must take action that will result in a falling edge of the interrupt cause. One way to accomplish this is to mask the interrupt cause at its source at the beginning of the ISR, and then un-mask the interrupt at the end of the ISR. When PSA Required mode is selected, to re-arm an individual interrupt, the ISR must reset the PSA bit associated with the interrupt. The PSA bit can be reset by writing a one (1) to it, or by toggling the per-vector mask bit associated with the interrupt.

When the interrupt toggle mode is disabled (Miscellaneous Control[8]=0), a bit in the PBA structure cannot be set while the corresponding bit in the PSA structure is set. When interrupt toggle mode is enabled (Miscellaneous Control[8]=1), a bit in the PBA can be set again as soon as an interrupt message has been sent to the host 106, and is not dependent on the corresponding PSA being reset.

After an interrupt message has been sent to the host 106, the interrupt control module 156 sets the corresponding bit in PSA[15:0] and resets the corresponding bit in PBA[15:0]. The PSA structure indicates which interrupt messages have been sent to the host but not serviced by the ISR. Multiple bits in the PSA may be set indicating that multiple interrupts are awaiting service.

A bit in the PSA can be reset by an ISR in one of two ways: i) The PSA is a R/W/1C field (i.e., Read/Write 1 to Clear). After the ISR has finished servicing an interrupt, the ISR may write a 1 to the corresponding bit in the PSA to reset the bit. The ISR can reset multiple bits in the PSA with a single write. ii) A bit in the PSA is reset automatically when a falling edge on an associated per-vector Mask Bit is detected. The per-vector Mask Bit is located at bit 0 of a Vector Control field of an MSI-X Table entry associated with an interrupt (see FIG. 4E). PSA bits can be reset by this method in both MSI and MSI-X modes.

Resetting the PSA is required when PSA Required Mode (Miscellaneous Control[8]=0) is selected, and is optional when the IRQ Toggle Mode (Miscellaneous Control[8]=1) is selected. When PSA Required mode is selected (Miscellaneous Control[8]=0), resetting the PSA re-arms the interrupt. A bit in the PBA can be set only after the corresponding bit in the PSA has been reset. If the Interrupt condition that caused the MSI-X message to be sent is still asserted when the PSA bit is reset, the PBA bit will be set again, resulting in another MSI-X message being generated.

When Interrupt Toggle mode is selected (Miscellaneous Control [18]=1), resetting the PSA does not re-arm the interrupt. The interrupt must be re-armed by forcing a de-assertion of the interrupt cause at its source. This can be done by masking and then unmasking the interrupt or by other methods specific to the interrupt cause. The PSA does not affect the PBA, and resetting the PSA is optional.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific integrated Circuit (ASIC); an electronic circuit; a combinational logic circuit: a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A system comprising:
   an interrupt generation module configured to generate an interrupt when a first indicator is set to a first state, wherein the first indicator transitions to a second state when the interrupt is generated;
   a processing detection module configured to
      detect when the interrupt is sent,
      set a second indicator to a third state to indicate when the interrupt is sent, and
      set the second indicator to a fourth state when the interrupt is processed; and
   an interrupt control module configured to
      prevent the first indicator from being set to the first state when the second indicator is in the third state, and
      allow the first indicator to be set to the first state when the second indicator is in the fourth state.

2. The system of claim 1, further comprising an interrupt detection module configured to:

detect when the interrupt is scheduled to be generated,
set the first Indicator to the first state to indicate when the interrupt is scheduled to be generated, and
set the first indicator to the second state when the interrupt is generated.

3. The system of claim 2, further comprising:
a device control module configured to control a device and to output a first data from the device to a bus,
wherein the first data is to be written to memory associated with a processor, and
wherein the interrupt detection module is configured to set the first Indicator to the first state when the first data is output to the bus.

4. The system of claim 3, wherein:
the interrupt generation module is configured to generate the Interrupt by outputting second data to the bus in response to the first Indicator being set to the first state;
the interrupt detection module is configured to set the first indicator to the second state when the second data is output to the bus; and
the processing detection module is configured to set the second indicator to the third state when the second data is output to the bus.

5. The system of claim 4, further comprising:
an interrupt processing module configured to process the interrupt,
wherein the interrupt processing module is configured to:
receive the first data before receiving the second data, and
notify the processing detection module when the first data has been processed,
wherein the processing detection module is configured to set the second indicator to the fourth state when the interrupt processing module has processed the first data.

6. The system of claim 4, further comprising a first-in first-out module configured to:
receive the first data followed by the second data from the bus, and
output the first data followed by outputting the second data to the processor.

7. A system comprising:
a device control module configured to control a device and to output first data from the device to a bus, wherein the first data is to be written to memory;
an interrupt generation module configured to generate the interrupt by outputting second data to the bus in response to the first data being output to the bus by the device control module;
an interrupt detection module configured to
detect when the first data is output to the bus, and
in response to detecting that the first data is output to the bus, set a first indicator to a first state to allow the interrupt to be generated,
wherein the interrupt generation module is configured to generate the interrupt in response to the first indicator being set to the first state, and
wherein the interrupt detection module is configured to
detect when the interrupt is generated, and
in response to detecting that the interrupt is generated, set the first Indicator to a second state,
an interrupt processing module configured to process the interrupt; and
a processing detection module configured to
detect when the second data Is output to the bus, and in response to detecting that the second data is output to the bus, set a second indicator to a third state, and
detect when the interrupt processing module completes processing the first data, and in response to detecting that the interrupt processing module has completed processing the first data, set the second indicator to a fourth state,
wherein the interrupt generation module is configured to not generate an additional Interrupt while the second indicator is in the third state and until the second indicator is set to the fourth state.

8. A method comprising:
generating an interrupt when a first Indicator is set to a first state, wherein the first indicator transitions to a second state when the interrupt is generated;
detecting when the interrupt is sent;
setting a second indicator to a third state to indicate when the interrupt is sent; and
setting the second indicator to a fourth state when the interrupt is processed;
preventing the first indicator from being set to the first state when the second indicator is in the third state; and
allowing the first indicator to be set to the first state when the second indicator is in the fourth state.

9. The method of claim 8, further comprising:
detecting when the interrupt is scheduled to be generated;
setting the first indicator to the first state to indicate when the interrupt is scheduled to be generated; and
setting the first indicator to the second state when the interrupt is generated.

10. The method of claim 9, further comprising:
outputting a first data from a device to a bus, wherein the first data is to be written to memory associated with a processor; and
setting the first indicator to the first state when the first data is output to the bus.

11. The method of claim 10, further comprising:
generating the interrupt by outputting second data to the bus in response to the first indicator being set to the first state;
setting the first Indicator to the second state when the second data is output to the bus; and
setting the second indicator to the third state when the second data is output to the bus.

12. The method of claim 11, further comprising:
receiving the first data before receiving the second data; and
setting the second indicator to the fourth state when the first data has been processed.

* * * * *